Patented Sept. 1, 1936

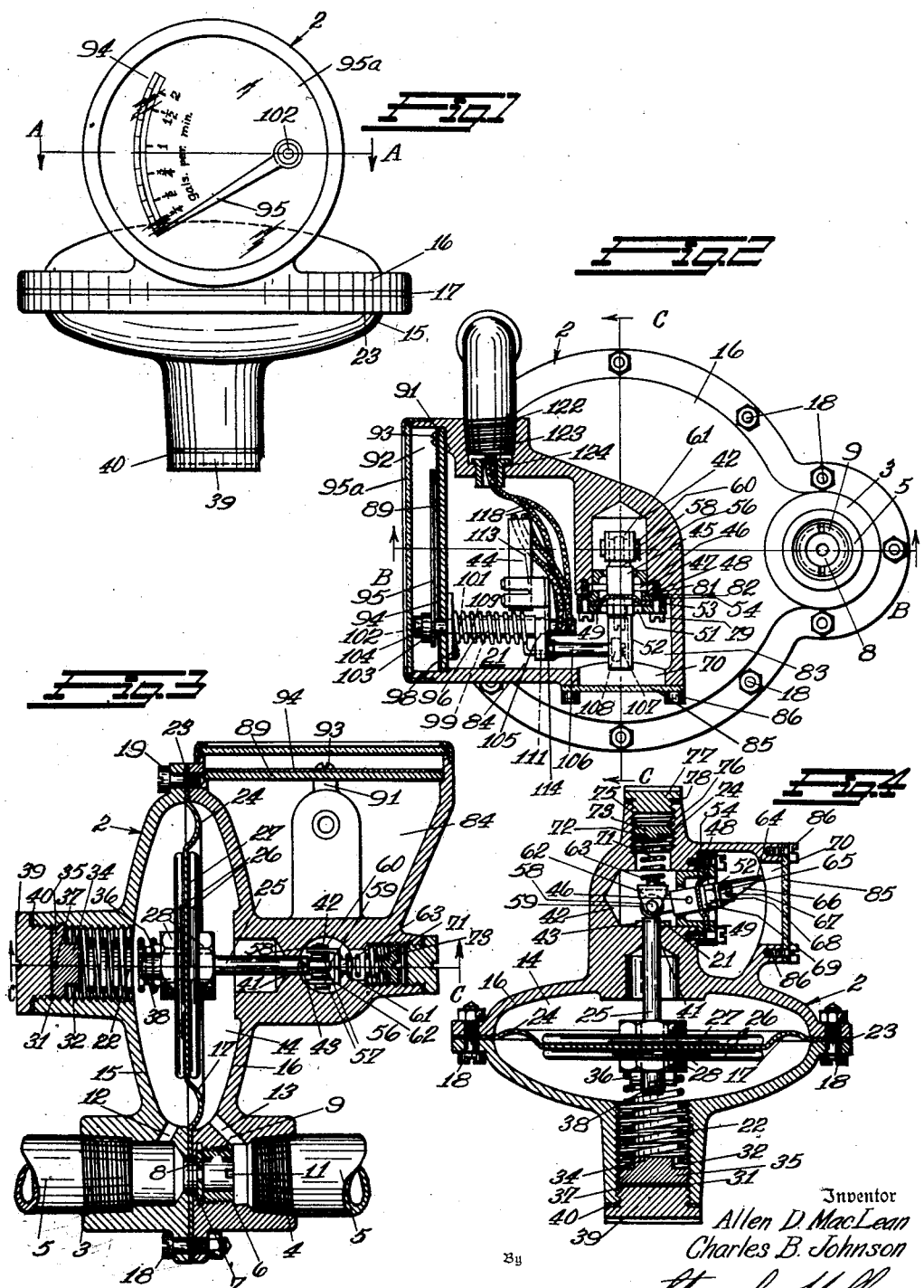

2,052,720

UNITED STATES PATENT OFFICE 2,052,720

FLOW INDICATING METER

Allen D. MacLean and Charles B. Johnson, Pittsburgh, Pa., assignors to Pittsburgh Equitable Meter Company, Pittsburgh, Pa., a corporation of Pennsylvania Application June 3, 1932, Serial No. 615,219

9 Claims. (Cl. 200—81)

Our invention relates to a novel meter and control device of compact unitary construction designed to indicate the flow of fluids through a conduit and control means operable thereby. The present invention is especially concerned with a flow meter and control device that responds to variations in differential pressures across an orifice or restriction in the conduit embodying fluid conduit connections having an orifice plate and pressure responsive means, circuit controlling means and novel unitary indicating and adjusting assemblies all associated in novel unitary relationship.

In the usual orifice meter there is a fitting in the conduit provided with a restricted opening for fluid flow, an indicating and recording means for mounting independently of the conduit fitting connected by pressure conduits, the separate indicating and recording means in many instances occupying valuable space. In many instances it is absolutely necessary to measure the quantity and indicate continuity of fluid flow. The additional connection between the orifice means and the indicating arrangements affects the dependability of prior meters.

The meter of the present invention is of novel unitary construction adapted for mounting in any desired position on the fluid conduit in which the flow to be measured or indicated exists. The meter of our invention is provided with novel indicating and control means which comprise unitary assemblies which may be adjusted in position or be removed for inspection or replacement. The novel means for adjusting and positioning the pressure responsive device and with it the indicating and control means constructed in accordance with our invention has general utility. The circuit controlling feature because of inherent safety, due to absence of sparks, may be used in an explosive atmosphere or in inflammable surroundings with no risk of explosion or fire. The inherent dependability of the indicating means because of absence of long frail conduit connections and the space saving advantage because of the novel unitary arrangement of parts is applicable in any location. The cheap, compact, safe and dependable device of our invention has a wide range of utility to indicate and record fluid pressure, gauge or sub-atmospheric, or differential pressure which may be caused to result from confined fluid flow.

Where it is vitally necessary that the fluid flow be maintained continuously and in a predetermined qauntity, as for example, in the flow of cooling fluid to thermionic devices, mercury arc rectifiers, transformers, or oil and water flow to turbines, the accurate indication of quantity of flow and dependable indication of existence of flow of a meter constructed in accordance with our invention has great utility. The circuit controlling means thereof, if desired, may be used for example to sound an alarm, complete or interrupt circuits for discontinuing the load on or operation of the devices or installations to which cooling fluid must be continuously supplied. The compactness and high degree of accuracy provided by the dependable rugged structure of our novel meter lends itself admirably to the suggested applications.

Accordingly a primary object of our invention concerns novel pressure responsive indicating apparatus in combination with controlling means operated in response to variations in differential pressure to which the pressure responsive apparatus is subjected, whereby apparatus subjected to fluid flow or causing fluid flow may be operated or controlled according to differential pressure caused by fluid flow.

Another object of our invention concerns novel pressure responsive apparatus in combination with electrical circuit controlling means operated in response to variations in differential pressure to which the pressure responsive apparatus is subjected, whereby to control electrical circuits in response to fluid flow.

Still another object of our invention is to produce novel responsive apparatus in which an indicator and controlling means are driven by an operator sealed to prevent escape of fluid to the indicator and controlling means whereby the indicating and controlling means are relieved of fluid pressure and are protected from explosive or corrosive fluids or fluid mixtures.

A further object of our invention concerns pressure responsive apparatus embodying a novel adjusting and balancing means for the pressure responsive element whereby extraneous influences affecting said pressure responsive element may be eliminated or compensated for.

A still further object of the present invention is to produce a novel compact differential pressure responsive circuit controlling meter or gauge of novel unitary construction which may be readily and cheaply manufactured.

A still further object of our invention is to produce a novel compact flow indicating meter of novel unitary construction which may be readily and cheaply manufactured.

A still further object of our invention is to produce a novel compact flow indicating meter and circuit closer made up of novel unitary assemblies assembled into a novel unitary structure.

A still further object of our invention is to produce a novel compact circuit controlling meter capable of use in an explosive atmosphere or in inflammable surroundings.

A still further object of our invention is to provide a novel compact gauge of universal application for quantitative indication in response to varying fluid pressure.

A still further object of our invention is to produce a novel compact flow indicating meter casing of separable parts provided with cavities for housing readily removable unitary indicating, adjusting and circuit controlling means.

The foregoing and other objects of the present invention will clearly appear in the following description when studied in connection with the accompanying drawing, wherein Figure 1 is a front elevational view of a novel flow measuring indicating circuit controlling meter constructed in accordance with our present invention.

Figure 2 is a sectional view taken in the direction of the arrows on a plane represented by lines A—A of Figure 1, with parts beyond the sectional planes shown in plan.

Figure 3 is a sectional view taken in the direction of the arrows on a plane represented by line B—B in Figure 2, with certain of the parts in elevation.

Figure 4 is a rear view in sectional elevation taken in the direction of the arrows on a plane represented by line C—C of Figure 3, with certain of the mechanisms shown in elevation.

With reference to the drawing in which like parts are indicated by like reference numerals, the preferred embodiment of the invention is illustrated as comprising a novel casing 2 embodying fluid conduit connections 3 and 4 for fluid conduit 5. Fluid conduit connection 4 is provided with a threaded bore 6 the bottom 7 of which provides a shoulder against which orifice plate 8 is positioned and held in place by tubular screw 9. Screw 9 is provided with diametrically opposite notches 11 in its walls for cooperation with a suitable tool for removing and replacing orifice plate 8 in a manner obvious from an inspection of the drawing. Passages 12 and 13 lead to diaphragm chamber 14 provided between the two parts or sections 15 and 16 of which casing 2 is preferably comprised. Parts or sections 15 and 16 receive diaphragm 17 in fluid tight clamping engagement between their adjacent faces forming the periphery of diaphragm chamber 14 and are held in intimate engagement with diaphragm 17 by suitable means for example screws 18 and 19. Sections 15 and 16 on either side of diaphragm 17 contain the indicating and circuit closing assemblies 21 and diaphragm spring 22 respectively as best shown in Figure 3, to be described in detail hereinafter. Diaphragm 17 may be formed if desired to provide flange 23 in contact with the adjacent faces of sections 15 and 16 of casing 2 to serve as a gasket between these members preventing fluid leaks and obviating the necessity of a separate gasket or gaskets. Reference character 24 indicates a corrugated or concave zone of diaphragm 17.

It will be obvious that if desired orifice plate 8 may be replaced by a disk of corresponding shape whereby the meter of our invention may be used as a gauge to indicate pressures above atmospheric pressure in connection member 3 or above sub-atmospheric pressure existing in chamber 4.

We have illustrated in the preferred embodiment of our invention suitable means forming an operative connection of diaphragm 17 with the indicator and the circuit controlling means 21, which if desired may comprise spindle 25, and plates or washers 26 positioned on each side of central portion 27 of diaphragm 17. Suitable fastening means as nuts 28 threaded on spindle 25 serve to clamp plates 26 in intimate contact with diaphragm central portion 27. Diaphragm spring 22 previously mentioned is housed in a suitable projection on casing member 15, provided with a bore 31 threaded throughout its length as indicated by reference character 32.

Compression spring 22 extends into bore 31 one end of which is received over projection 34 of screw 35 threaded into engagement with threads 32 of bore 31, the other end surrounding ring 36 on spindle 25 to retain it in position. Screw 35 is provided with slot or kerf 37 for engagement with a suitable tool so that its position in bore 31 may be altered to change the compressive force of spring 22 for a purpose to be described.

Ring 36 is retained on spindle 25 by suitable means as for example cotter pin or key 38. Removable screw cap 39 and gasket 40 permit access to screw 35 for adjustment purposes and also serve as a fluid tight closure for bore 31.

Spring 22 is selected to have characteristics such that diaphragm 17 floats and supports the weight of the parts associated therewith. This condition may be realized by altering the position of screw 35 in bore 31 to change the compressive force of spring 22.

The parts so far described may be conveniently assembled by the following procedure if desired. One of nuts 28 is first threaded onto spindle 25 after which plate 26, diaphragm 17, outer plate 26, remaining nut 28 and ring 36 are applied to spindle 25 in the order named. Pin 38 is inserted to retain ring 36 in position on spindle 25. Spindle 25 with its assembled parts may now be handled as a unit. An end of spindle 25 may be inserted in opening 41 in casing member 16 communicating with bore 42. Pin 43 is applied to spindle 25 from the end of bore 42 to retain it in place in opening 41. Diaphragm 17 may now be aligned so that its flange 23 is in contact with casing 16, after which casing member 15 is applied in the position shown in the drawing. Casing members 15 and 16 are now clamped by bolts 18 and screw 19. Spring 22 may be inserted through bore 31 to engage over ring 36 after which screw 35 is threaded into bore 31. Sealing screw 39 and gasket 40 close the end of bore 31. The foregoing procedure for assembling the casing and diaphragm 17 is given as a suggestion for a convenient method of assembly of casing members 15 and 16 with diaphragm 17 and its adjusting means. It is obvious that other steps may be followed, for example, spring 22 may be inserted after screws 35 and 39 are in place in bore 31 but before casing members 15 and 16 are aligned prior to clamping with bolts 18 and screw 19.

Casing section 16 has an interior arrangement, which it will appear as the description proceeds, compactly receives indicating mechanism 21, associated circuit controller 44, and pivoted operative connection 45 from diaphragm 17 to indicating mechanism 21 and circuit controller 44. In the preferred embodiment of our invention pivoted operative connecting means 45 is fulcrumed on pin 46 received in suitable holes 47 in casing or capsule 48. Casing 48 is provided with cover 49 apertured at 51 to permit free movement of projection 52 on pivoted arm 45. A diaphragm 53 of suitable flexible material as for example treated fabric or leather, is received and clamped between flange 54 of casing 48 and cover 49 to provide a fluid tight seal for bore 42, provided in casing member 16, in communication with diaphragm chamber 14 through opening 41. Pivoted arm 45 has an extension 56 of reduced diameted bifurcated as best shown in Figure 3 to provide arms 57 to receive pin 58 on which is journaled roller 59. Pin 58 is retained in position by suitable means as for example cotter pin or key 60. Channel shaped member 61 provided with flanges 62 is apertured to receive pin 58 whereby channel member 61 is pivoted at the end of arm 45 on reduced end 56 thereof. Member 61 is provided with a teat or projection 63 for a purpose to be hereinafter described. Projection 52 of arm 45 is formed preferably from sheet metal comprising a cam surface 64, an upstanding connecting end 65 and a stiffening web 66. Screw 67 and nut 68 retain projection 52 in position on arm 45. Washer 69 received against nut 68 on screw 67 presses sealing diaphragm 53 in fluid tight relation with the shouldered end of arm 45. Escape of fluid from diaphragm chamber 14 by way of opening 41 and bore 42 is thus effectively prevented. Casing 48 with arm 45 and its associated parts form a unitary assembly which may be inserted in bore 42 through aperture 70 provided in casing member 16 opposite bore 42.

Roller 59 of arm 45 is pressed into operative contact with spindle 25 so that it may accurately and closely follow the movement of spindle 25 imparted to it by diaphragm 17 whereby increments of movement of arm 45 may be proportional to increments of movement of diaphragm 15 with substantially no drag or opposing force to the response of diaphragm 15 to differential pressure created by the presence of orifice plate 14. This may, if desired, be accomplished by means of spring 71, one end of which engages teat 63 of channel member 61. The opposite end of spring 71 engages teat 72 on wafer shaped screw 73 in bore 74 in threaded engagement with threads 75. Adjustment of spring 71 is accomplished by engagement with a suitable tool with kerf 76 of wafer screw 73. Bore 74 may be closed by fluid tight means comprising screw or stud 77 and gasket 78.

The parts described comprising the operative connecting means may be conveniently assembled for insertion in bore 42 in the following manner. Arm 45 may first be inserted in casing or capsule 48 from the front so that extension 56 and bifurcated ends 57 extend beyond the rear of casing 48. Roller 59 and channel piece 61 may next be assembled on arm 45 by insertion of pin 58 through these related parts after which cotter key 60 is applied to pin 58 to retain the parts in place. The parts at the other end of arm 45 may now be assembled by inserting screw 67 through an aperture in end 65 of extension 52 and applying nuts 68 to screw 67 after which screw 67 with the parts heretofore assembled on it may be inserted through the central aperture in sealing diaphragm or gland 53. Screw 67 may be threaded into the arm 45 opposite extension end 56. Cover 49 may now be applied over the end of arm 45 carrying extension 52 and screws 79 inserted in corresponding apertures in cover 49, diaphragm 53 and casing or capsule 48. The complete assembly may now be inserted in bore 42 through aperture 70 in casing member 16. A suitable tool is used to drive screws 79 home in threaded holes 81 in shoulder 82 provided by the boundary of chamber 83 in communication with chamber 84 for a purpose to be hereinafter described. Final adjustment of the position of member 52 may now be had by insertion of a proper tool for example a screw driver through aperture 70 for cooperation with screw 67 of member 52. If desired shoulder 82 and flange 54 of capsule 48 may furnish a fluid type seal by means of a ground joint formed by their surfaces in contact, however, if desired suitable means as for example a gasket may be clamped between shoulder 82 and flange 54 by screws 79. If desired, chamber 83 may be closed by cover 85 retained by suitable fastening means for example screws 86.

Indicating mechanism 21 and associated circuit controller 44 are housed in chamber 84 the former projecting into chamber 83 for cooperation with operating cam surface 64 of extension 52 previously described. The opening in chamber 84 opposite chamber 83 is closed by dial plate 89. Plate 89 rests against shoulder 91 provided by enlarged opening 92 and is held in position by suitable means as for example screws 93. A separate dial 94 may be provided over dial plate 89 having proper indicia or marking in the form of a scale to be traversed by pointer 95.

Dial 94 may, if desired, be provided with scale markings as indicated in the accompanying drawing. The upper set of divisions may serve as a guide in determining the position of circuit controller 44 and the rate of flow without reference to the actual volume being passed and may be marked to indicate for example, one-fourth full flow, one-half full flow, etc. The lower scale may be accurately calibrated to give a definite reading in actual units such as gallons per minute. Dial 94 may bear in addition to the scale markings a legend to designate the fluid for which the accurately calibrated scale is intended and in addition may supply information to indicate conditions under which the lower scale gives a correct reading by stating a viscosity range in proper units and a temperature range which in general will be the viscosity and temperature ranges prevailing at the time of the calibration test to locate the markings of the lower scale. A transparent cover 95a is provided for dial 94.

A hollow post or bearing tube 96 is mounted on dial plate 89 secured thereon by suitable means as for example screw 98. Post 96 is hollow providing a bore 99 in which is journaled pointer shaft 101. Pointer 95 is slipped over reduced end 102 of pointer shaft 101 and clamped in position by suitable means as for example nut 103 and check nut 104. Pointer shaft 101 is made to rotate in accordance with the movements of diaphragm 17 by means of crank arm 105 secured thereto carrying member 106. Journaled on the end of member 106 by the means of screw 107 is a small roller 108 for cooperation with cam surface 64 of extension 52 on arm 45. Pointer 95 is biased toward its zero position by helical spring 109 surrounding tube 96. Helical spring 109 abuts against screw 98 at one end, its other end engaging crank arm 105 as indicated by reference numeral 111. It will be seen that spring 109 need be only of sufficient stiffness to cause roller 108 to accurately follow the movements of extension 52 imparted to it by diaphragm 17, in accordance with variations of the differential pressure, We have chosen to illustrate circuit controller 44 as being of the mercury contact tube variety. However, it is obvious that any form of circuit making and breaking contact may be employed, the movable contact member of which is actuated into and out of circuit closing position in accordance with the movements of diaphragm 17. Circuit controller 44 is carried by resilient clips or ears 113 bent outwardly from circuit controller carrying member 114. Member 114 is provided with an aperture so that it may be slipped over the end of pointer shaft 101 until it abuts the check of the crank arm 105. It is thus firmly held in position on pointer shaft 101, but may be rotated about it to position circuit controller 44 into proper circuit controlling position, regardless of the position of casing 2. If desired, electrical conducting leads 118 may be inserted through holes in pointer shaft 101 to take the strain thereof from circuit controller 44 and to permit a neat disposition of leads 118 within cavity 84. Suitable means for entry of leads 118 to chamber 84 is provided by conduit 122 suitably connected to casing member 17 as for example by engagement of threads with threaded aperture 123. A bushing 124 of fiber or other suitable electrical insulating material is provided in aperture 123 to prevent chafing of leads 118 at the point of entry to chamber 84. The assembly of indicating and circuit controlling means 44 will be obvious from the foregoing.

Indicating means 21 and circuit controlling means 44 after assembly on dial plate 89 may be inserted in chamber 84 as a unit or be readily removable for purposes of inspection and adjustment if desired without disturbing adjustment of other parts associated with casing member 16.

The indicating flow meter of our invention may be manufactured at a low cost, each corresponding group or assembly of parts thereof being interchangeable and readily removable for inspection and adjustment.

The compactness and accuracy of the meter of our invention gives it great utility where space is limited and where dependable indication of the quantity of flow of the fluid or stoppage of flow is vital.

The operation and adjustment of a meter constructed according to our invention will now be described. Fluid flowing in either direction in conduit 5 will cause a differential pressure on opposite sides of diaphragm 17 by reason of the presence of restriction 8. This difference in fluid pressure on opposite sides of diaphragm 17 causes it to move toward the side of least pressure an amount proportional to the pressure difference. Rod or spindle 25 shares in this movement and is guided by aperture 41 in casing member 16 to prevent inaccuracies and errors which may arise by eliminating side play of spindle and tilting or distortion of diaphragm 17.

Roller 59 of pivoted arm 45 is pressed against the end of spindle 25 by spring 71 with sufficient pressure so that arm 45 will accurately follow the movements of spindle 25. Sealing diaphragm 53 permits free movement of arm 45 but confines the fluid to bore 42 which may leak from chamber 14 by way of opening 41 thus preventing indicating and control means 21 from being subjected to fluid pressure or to corrosive action in case the device is used with corrosive fluids such as illuminating gas or gasoline. Explosive mixtures are also prevented from appearing in chamber 84.

Indicating and controlling means respond to the movements of diaphragm 17 transmitted by spindle 25 and pivoted arm 45 by means of roller 108 in operative contact with cam surface 64 of extension 52 on arm 45. Roller 108 and crank 105 impart rotational movement to shaft 101 which carries pointer 95 cooperating with a graduated scale or other suitable indicia on dial 94 and adjustable carrying member 114 which carries circuit controller 44. Tilting movement imparted to circuit controller 44 causes it to assume circuit open and circuit closed positions inasmuch as the conducting liquid contained in controller 44 is in electrical contact with fixed contacts in controller 44 or in electrical contact with only one of the fixed contacts or out of contact therewith, depending on the position to which controller 44 is tilted.

Spring 109 reacts against crank 105 to press roller 108 against cam surface 64 of arm 45.

Pivot 46 of arm 45 is displaced with respect to the axis of shaft 101 resulting in greater angular movement of shaft 101 for a given angular movement of arm 45 by virtue of the greater distance between pivot 46 of arm 45 and the changing point of contact of roller 108 and cam surface 64 than the distance between the axis of shaft 101 and the axis of roller 108.

It is obvious that diaphragm 17 having appreciable area exposed to fluid pressure existing in chamber 14, acts as a motor having sufficient power to move any desired control means for example a valve operator which may be substituted for circuit controller 44.

The novel adjusting means of our invention comprising springs 22 and 71 with their adjustable abutments in the form of screws 35 and 73 respectively may be manipulated to position diaphragm 17 to a neutral position and pointer 95 to a suitable graduation on dial 94, for example a zero reading by the following procedure. With balanced pressure on each side of diaphragm 17 screw 35 is rotated by a suitable tool in engagement with kerf 37 until pointer 95 is opposite a predetermined indication for example a zero mark on dial 94. Diaphragm 17 is selected to have characteristics such that when spring 22 is placed under compression by manipulation of screw 35 so that pointer 95 indicates zero, the compressive force of spring 22 substantially balances the weight of diaphragm 17 and the parts carried by it so that it is free from initial distorting force or stress and is rendered thereby very sensitive to changes in fluid pressure.

Spring 71 is adjusted by means of screw 73 so that its compressive force is sufficient to press roller 59 against spindle 25 to cause it to follow the movements of spindle 25. It will be seen that as the center of diaphragm 17 moves toward either direction, the compressive force of one of springs 22 and 71 will decrease as the other increases, thus tending to correct errors which may arise because of variations in the characteristics of these springs.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a flow meter; a casing having a plurality of compartments therein; a differential pressure responsive device in one compartment; and an assembly in said other compartment comprising a capsule having a cam member pivoted therein and a sealing member cooperating with said cam member; means for transmitting movement of said device to said cam member; and an indicating element cooperating with said cam member sealed by said sealing member from said other compartment.

2. In combination, indicating means, comprising an operative connection, a pressure responsive diaphragm including movement transmitting means to said indicating means, a relatively heavy spring in abutting relation to said pressure responsive diaphragm, an adjustable abutment for said spring whereby said spring may be caused to resiliently support said diaphragm and said movement transmitting means, a relatively light spring in abutting relation to said operative connection, an adjustable abutment for said second mentioned spring whereby said operative connection operatively engages said movement transmitting means in all positions thereof, the change of compressive force in said second mentioned spring substantially balancing the change of compressive force of said first mentioned spring during movements of said pressure responsive diaphragm.

3. In a flow meter, a casing having a compartment therein; a device therein responsive to pressure differential; a pivoted cam member in a second compartment communicating with said first compartment; means for transmitting movement of said device to said cam member; means forming a seal with said cam member; and an indicating element cooperating with said cam member to show the rate of flow.

4. In a flow meter a casing having a compartment; a cover therefor; a diaphragm having its edges secured between the casing and cover, said casing and cover having passages therein leading to opposite sides of said diaphragm; a rod operatively connected to said diaphragm and guided in said casing for reciprocating movement therewith; a cam member pivotally mounted at an angle to said rod and contacting therewith in a second chamber in said casing; a sealing diaphragm through which said cam member extends in sealing relation to seal said second chamber; said casing providing a third chamber surrounding the same; a plate for closing said third chamber, a shaft journalled in said plate having a crank arm at one end thereof cooperating with said cam; an indicator mounted on the opposite end of said shaft, and an electric switch member coupled to said shaft.

5. In a combined flow indicator and controller, a casing having a plurality of compartments therein, pressure responsive means in one of said compartments, a capsule including a sealing diaphragm for separating said compartments, a crank, a lever pivotally carried by said capsule and projecting through said diaphragm in fluid confining relation, one end thereof cooperating with said pressure responsive means and the other end cooperating with said crank to transmit movements of said pressure responsive means thereto.

6. In combination with an apparatus as defined in claim 5, an indicating dial and electrical circuit controller operated by said crank.

7. In a combined flow indicator and controller, a casing having a plurality of compartments therein, a mounting plate secured across one of said compartments, a shaft rotatably journalled on said plate, control operating means adjustably carried by said shaft, pressure responsive means in another of said compartments, and means including sealing means forming an operative connection between said pressure responsive means and said shaft whereby said shaft is operated in accordance with pressure variations and said compartments are sealed.

8. In a combined flow indicator and controller, a casing having a plurality of compartments therein, a mounting plate secured across one of said compartments, a shaft rotatably journalled on said plate, electrical circuit control means adjustably carried by said shaft, pressure responsive means in another of said compartments, and means including a sealing diaphragm forming an operative connection between said pressure responsive means and said shaft whereby said shaft and control means are rotated in accordance with variations in pressure.

9. In a flow meter, a casing having a compartment; a cover therefor; a diaphragm having its edges secured between the casing and cover, said casing and cover having passages therein leading to opposite sides of said diaphragm; a rod operatively connected to said diaphragm to reciprocate therewith; a sealing diaphragm providing a second chamber; a cam member extending through said diaphragm in sealing relation and pivotally connected at an angle to said rod; a plate providing a chamber; a rotatable shaft journaled in said plate having a crank arm at one end thereof cooperating with said cam; and means mounted on said shaft to be actuated thereby.

ALLEN D. MacLEAN.
CHARLES B. JOHNSON.